United States Patent [19]
Bottoms

[11] 3,825,377
[45] July 23, 1974

[54] GEAR PUMPS AND MOTORS

[75] Inventor: Harry Simister Bottoms, Solihull, England

[73] Assignee: Joseph Lucas (Industries) Limited, Birmingham, England

[22] Filed: Apr. 28, 1972

[21] Appl. No.: 248,381

[30] Foreign Application Priority Data
Apr. 28, 1971  Great Britain .................... 11774/71

[52] U.S. Cl. ............................... 418/170, 418/179
[51] Int. Cl. .......................... F01c 1/10, F01c 21/00
[58] Field of Search .......................... 418/179, 170

[56] References Cited
UNITED STATES PATENTS

| | | | |
|---|---|---|---|
| 238,603 | 3/1881 | Medden | 418/179 |
| 2,956,841 | 10/1960 | Cametti et al. | 308/237 R X |
| 3,077,840 | 2/1963 | Wood | 418/179 |
| 3,263,425 | 8/1966 | Rohde | 418/206 X |
| 3,276,387 | 10/1966 | Bottoms | 418/206 X |

FOREIGN PATENTS OR APPLICATIONS
1,936,516  1/1970  Germany ........................... 418/170

OTHER PUBLICATIONS
Hudson, The Engineers' Manual, 1949, p. 315, John Wiley & Sons, Inc., New York.

*Primary Examiner*—Carlton R. Croyle
*Assistant Examiner*—Richard E. Gluck
*Attorney, Agent, or Firm*—Holman & Stern

[57] ABSTRACT

A gear type pump or motor has its gears supported in bearings mounted in bearing support portions of the housing with the whole of the pump interior containing fluid. The housing and gears are made of different materials e.g., titanium and steel respectively, so that the bearing clearance is reduced as the temperature rises to compensate for the reduced viscosity of the working fluid.

6 Claims, 2 Drawing Figures

GEAR PUMPS AND MOTORS

BACKGROUND OF THE INVENTION

This invention relates to gear pumps and motors of the type comprising a housing including bearing support portions, journal bearings carried by said support portions, meshed gears carried by said bearings and ports in the housing on opposite sides of the zone of mesh of said gears.

With pumps and motors of this type it is found that the bearings tend to lose their effectiveness when the temperature of the fluid rises, as a result of the decreased viscosity of the fluid.

OBJECTS AND SUMMARY OF THE INVENTION

It is an object of the invention to provide a gear pump or motor in a convenient form in which the decreased bearing effectiveness at elevated temperature is at least partially offset.

In a gear pump or motor of the kind specified and in accordance with the invention, at least the bearing support portions of the housing are formed of a material having a lower coefficient of thermal expansion than the material of the gears with, the bearings being constrained against expansion by the support portions.

Thus, when a rising fluid temperature causes expansion of the gears and the bearing supports, the diameters of the latter are increased less than the diameters of the bearing engaging portions of the gears, so that the clearances are reduced, thereby compensating for the reduced viscosity.

Conveniently, the whole housing is formed of the low expansion material, which may be titanium when steel is used for the gears.

An example of the invention is shown in the accompanying drawings in which:

BRIEF DESCRIPTION OF THE INVENTION

FIGS. 1 and 2 are mutually transverse sections through a pump.

DETAILED DESCRIPTION OF THE INVENTION

Figure 1:
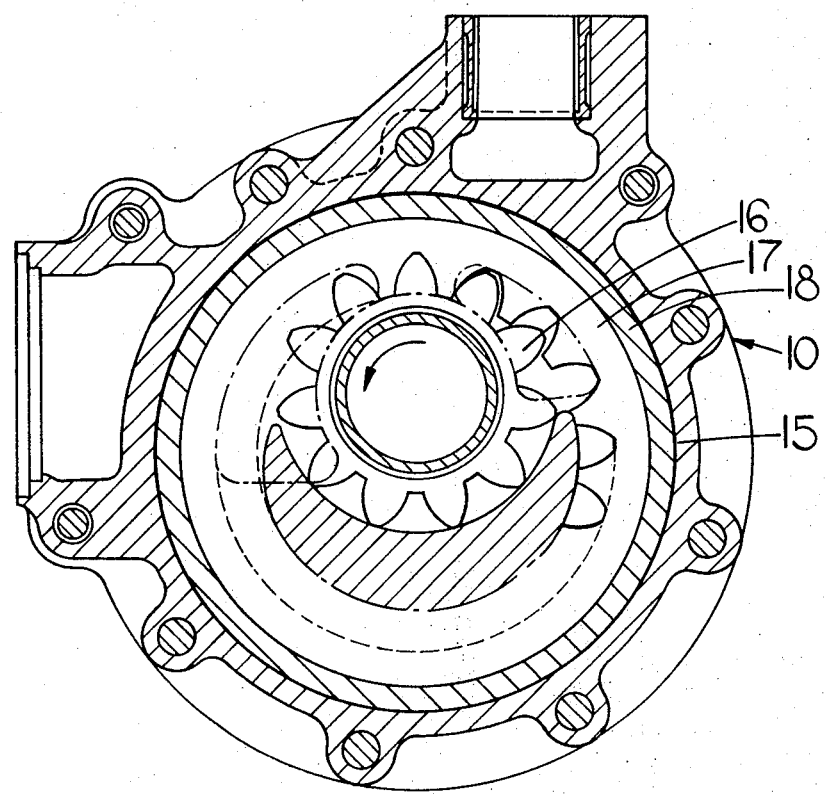
Figure 2:
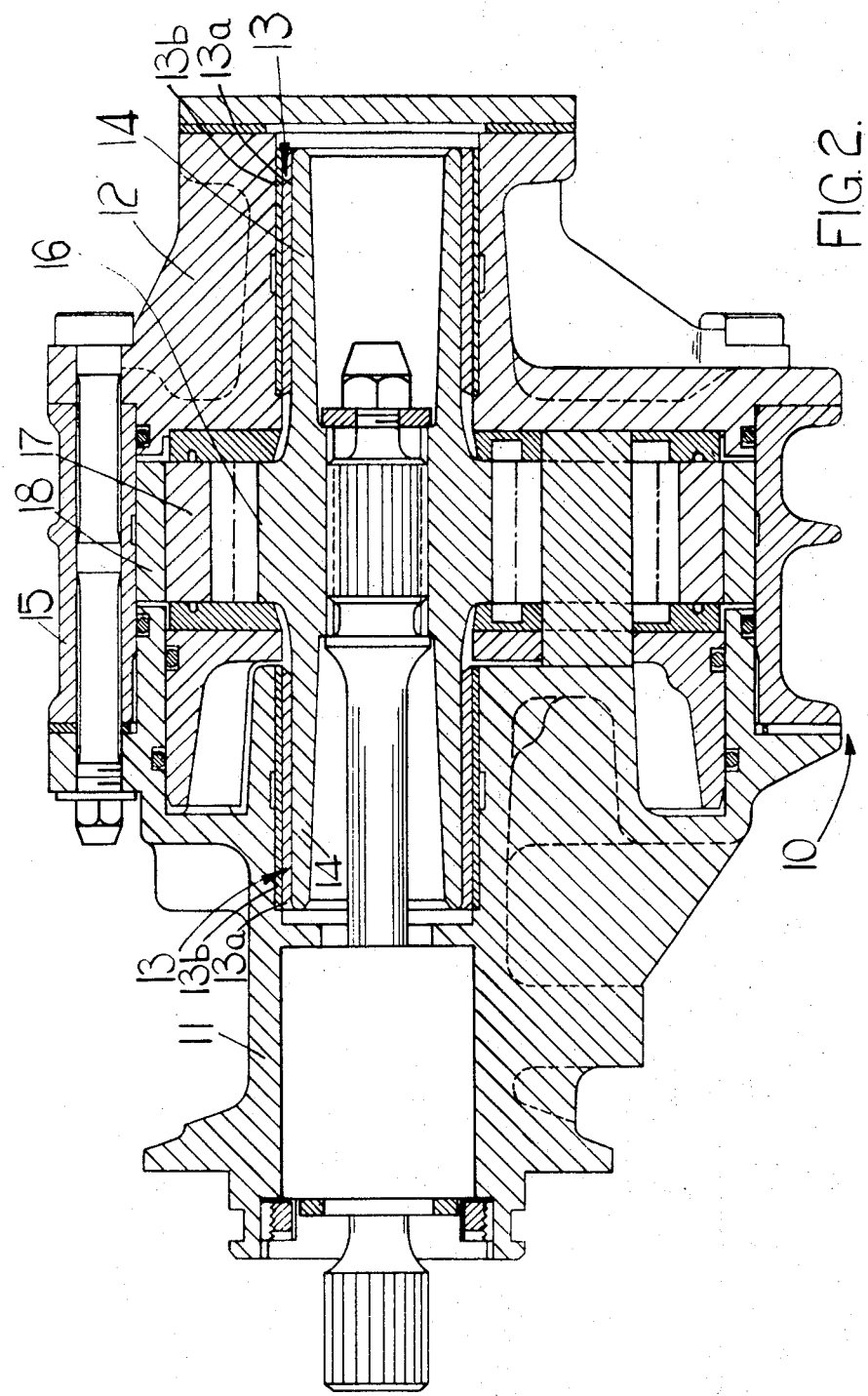

In the pump shown, a housing 10 of the pump is in three parts or sections 11, 12 and 15. The parts 11 and 12 support journal bearings denoted generally 13 in which hollow trunnions 14 integral with a pinion 16 run. In addition, a bearing ring 18 is supported by the part 15 and this provides a journal bearing for an internally toothed ring gear 17 meshed with the pinion 16.

According to the present invention all three parts of the housing are formed of titanium, while the gears 16, 17 are formed in steel. The housing is thus formed of a material having a lower coefficient of expansion than that of which the gears are formed. Expansion of the bearings 13 and 18 at a rate in excess of the expansion of the housing is restrained by internal stresses in the housing material.

The bearings 13 each preferably comprise an inner carbon liner 13a fitted into a steel sleeve 13b which is in turn fitted into the housing part 11 or 12. The steel sleeve 13b is shrunk onto the liner 13a and this assembly is then freeze-shrunk and inserted into its seat in the housing.

The invention may also be applied to conventional gear pumps of the type using two meshed pinions. In this case the housing, which may again be in three parts, need only have those parts which support the bearings for the pinions formed of the low expansion material.

I claim:

1. A gear pump or motor including end sections and an inner section therebetween defining a housing, each end section and inner section having a bearing support portion, a journal bearing carried by the support portion of each end section, a bearing ring carried by the support portion of the inner section, drive means having trunions and a first gear integral with the trunions, said truninons being mounted in the journal bearings of the end sections, a second gear journaled in said bearing ring and in mesh with said first gear, inlet and outlet ports for a working fluid provided on opposite sides of the point of interengagement of said first and second gears, and means for reducing the bearing clearance as the temperature rises to compensate for reduced viscosity of the working fluid, said means comprising at least said bearing support portions of the inner section and the end sections being formed of a material having a lower coefficient of thermal expansion than the material of trunions and the first and second gears, the journal bearings and bearing ring being constrained against expansion by the support portions of the inner section and the end sections.

2. The gear pump or motor as claimed in claim 1 in which the whole housing is formed of said material having a lower coefficient of thermal expansion.

3. The gear pump or motor as claimed in claim 1 in which the gears are formed of steel and at least the bearing support portions are formed of titanium.

4. The gear pump or motor as claimed in claim 1 in which said first gear is a pinion.

5. The gear pump or motor as claimed in claim 1 in which the bearings for said trunnions are carbon lined steel sleeves fitted into the bearing support portions of the housing.

6. A gear or motor as claimed in claim 4 in which the second gear is a ring gear having internal teeth with which said pinion meshes.

* * * * *